Jan. 30, 1945.   H. J. SEAMAN   2,368,331
PULVERIZING MACHINE
Filed Sept. 4, 1941   2 Sheets-Sheet 1
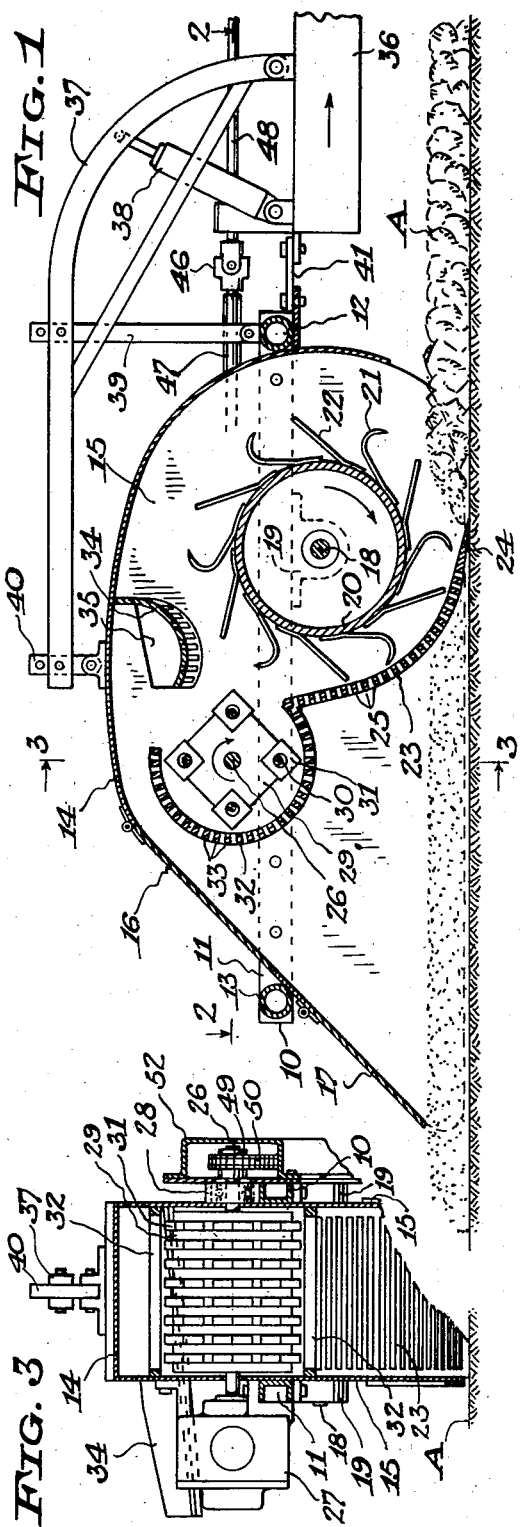
INVENTOR
HARRY J. SEAMAN
By Christopher L. Waal
ATTORNEY Jan. 30, 1945. H. J. SEAMAN 2,368,331
PULVERIZING MACHINE
Filed Sept. 4, 1941 2 Sheets-Sheet 2
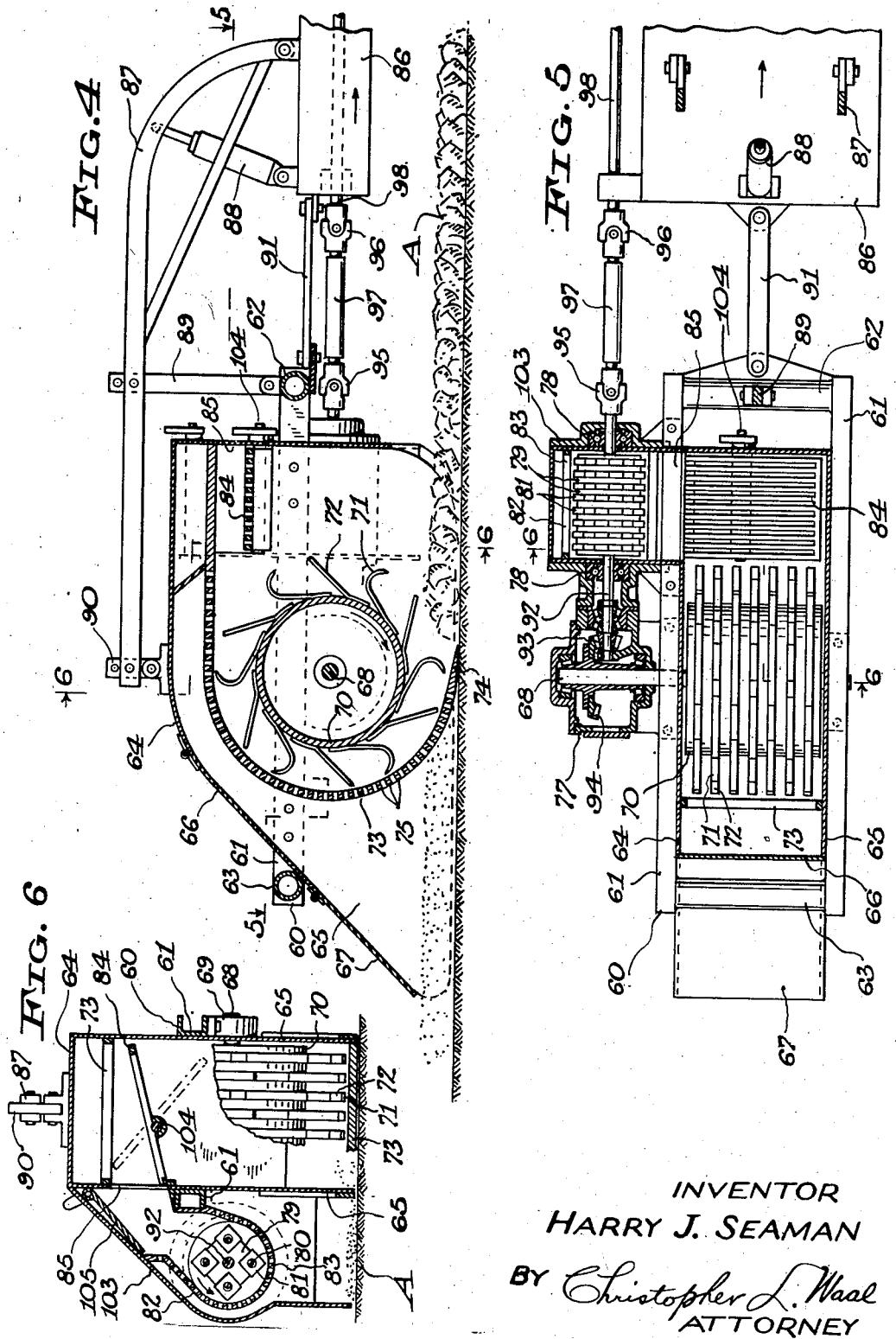
INVENTOR
HARRY J. SEAMAN
BY Christopher L. Waal
ATTORNEY Patented Jan. 30, 1945

2,368,331

UNITED STATES PATENT OFFICE 2,368,331

PULVERIZING MACHINE

Harry J. Seaman, Milwaukee, Wis.

Application September 4, 1941, Serial No. 409,522

6 Claims. (Cl. 94—40)

The present invention relates to apparatus for pulverizing and mixing soil and other materials, as in road building and agriculture.

An object of the invention is to provide an improved pulverizing machine which is adapted for travel along soil or other material to be worked and which will produce efficient pulverization of the material.

Another object of the invention is to provide a pulverizing machine which will be economical in power consumption and which in normal operation is capable of reducing the material to the desired degree of fineness in a single pass of the machine.

A further object is to provide a pulverizing machine which is of simple and durable construction and which can be inexpensively manufactured.

The invention further consists in the several features hereinafter described and claimed.

In the accompanying drawings, illustrating certain embodiments of the invention, Fig. 1 is a longitudinal sectional elevation of one form of pulverizing machine constructed in accordance with the invention;

Fig. 2 is a sectional view thereof taken generally along the line 2—2 of Fig. 1;

Fig. 3 is a transverse sectional elevation taken generally along the line 3—3 of Fig. 1;

Fig. 4 is a longitudinal sectional elevation of a modified form of pulverizing machine;

Fig. 5 is a sectional view taken generally along the line 5—5 of Fig. 4, and

Fig. 6 is a transverse sectional view of the machine of Fig. 4, taken generally along the lines 6—6 of Figs. 4 and 5.

In the embodiment of the invention shown in Figs. 1 to 3, 10 designates a rectangular frame which comprises side frame members 11, such as channel bars, rigidly connected by front and rear tubular cross members 12 and 13, respectively. Rigidly mounted on the frame, and in effect forming a part thereof, is a hood-like housing 14 which is closed at the top, front, rear and sides and is open at the bottom. The sides of the housing are formed by parallel vertical panels or walls 15 which are rigidly secured to the side frame members 11. The rear portion of the housing is sloping and includes outwardly swingable hinged doors 16 and 17. The housing is adapted to be moved over a bed of road material A to be pulverized, as hereinafter described.

A horizontal shaft 18 extends transversely within the housing and is journalled at opposite ends in bearing brackets 19 secured to the side frame members 11. A drum 20 is carried on the shaft to rotate therewith in the direction indicated by the arrow in Fig. 1, and is provided with a plurality of outwardly projecting resilient tools 21 and 22. The tools 21 have hooked, pick-forming free ends pointing in the direction of rotation, and the tools 22 are in the form of bars or blades extending approximately tangentially of the drum and with their free ends arranged in a trailing position with respect to the direction of rotation.

A concave grate 23 is suitably secured to the side walls of the housing and extends partially around the tool drum at the rear and bottom of the drum. The grate is approximately concentric with the drum and has a forwardly projecting lower edge 24 below the drum to form a shovel or scraper engageable with the road material. The grate comprises a series of cross bars 25 which are spaced a short distance from the circular path of the tool ends, and the upper rear end of the grate extends slightly higher than the level of the shaft 18. The tool drum or rotor forms a pulverizer and also forms a conveyer for carrying material rearwardly and upwardly along the grate.

Spaced rearwardly of the tool drum shaft 18 is a second rotatable shaft 26 parallel hereto and at a higher elevation. The shaft 26 is journalled at opposite ends in a gear casing 27 and in a bearing bracket 28 secured to the respective side frame members 11. The shaft 26 carries a plurality of axially spaced rotor plates 29 which are perpendicular to the shaft and which at their peripheral portions support a series of spaced rods 30 extending parallel to the shaft. Hammers 31, here shown in the form of apertured square plates, are loosely pivotally carried by the rods 30 and are disposed between the spaced plates 29. A concave grate 32 extends partially around the hammer rotor at the top, rear and bottom thereof, and at its forward lower end is connected to the grate 23. The grate 32 includes a series of spaced cross bars 33 which extend between and are secured to the opposite side walls of the housing and are spaced a short distance from the circular path of hammer tips. The front of the hammer rotor is exposed so as to receive lumps or clods thrown from the tool drum. The hammer rotor and the cooperating grate 32 form a hammer mill unit.

In some instances, a transverse chute or spout 34 is carried by the housing at a point spaced forwardly of the hammer rotor and above the level of the hammer rotor shaft to receive hard stones or lumps thrown from the hammer rotor and to discharge the same laterally of the housing, the chute extending through an opening 35 in a side wall of the housing.

The housing 14 is supported and drawn by a suitable vehicle 36, such as a truck or tractor, or an intermediate trailer. A rearwardly projecting crane or jib 37 is pivotally carried by the vehicle and is adjustably elevated as by a hydraulic cylinder 38. The housing is suspended from the crane, as by means of adjustably mounted suspension links 39 and 40 which may also form towing means for the housing. In some instances, however, a pivotally mounted towing bar 41 connects the vehicle and housing.

The gear casing 27 carries a drive shaft 42 projecting forwardly therefrom and provided with a bevel pinion 43 meshing with a bevel gear 44 on the hammer rotor shaft 26. The drive shaft is connected through universal joints 45 and 46 and an intermediate telescoping shaft 47 with a power shaft 48 carried by the vehicle. The power shaft is driven in any suitable manner, as by a gasoline engine, not shown.

The end of the hammer rotor shaft 26 distant from the gear casing 27 carries a sprocket wheel 49 connected by a transmission chain 50 to a somewhat larger sprocket wheel 51 on the drum shaft 18, thus providing a speed reduction drive for the tool drum or rotor. The chain drive is protected by a suitable casing 52. The hammer rotor preferably has a peripheral speed which is somewhat greater than that of the tool rotor. By way of example, the tool rotor may have a peripheral speed of 2000 to 3000 feet per minute, while the hammer rotor may have a speed of 9000 to 12,000 feet per minute. The two rotors and their grates constitute first and second stage comminuting or pulverizing devices.

In operation, the pulverizing machine is drawn at a suitable low rate of speed over the road bed to be worked, the road material, such as clay or old asphalt, having been first broken up into lumps as by means of a scarifier. During the advance of the machine, the grate edge 24 forms a scoop or scraper for the road material. The shafts 18 and 26 of the two comminuting rotors are driven at suitable speeds in the directions indicated by arrows. The rotary tools 21 and 22 break up the material by a plowing and impact action and by rubbing action against the cross bars of the concave grate 23, and carry the material rearwardly and upwardly along the grate. The rubbing action is furnished to a considerable extent by the trailing tools 22. The spaced cross bars 25 of the grate present edges or shoulders which contribute to the abrading or pulverizing action. Under excessive pressures the resilient tools 21 and 22 will yield rearwardly and inwardly, thus reducing danger of breakage. The comminuted material finds its way rearwardly through the slot-like apertures of the sieve-forming grate 23, thus removing this material from the comminuting zone. In the case of ordinary compacted road material, about 80% to 90% of the material will be reduced to the desired fineness by the tool drum, and the rest will be elevated and thrown into the hammer mill and there reduced, the comminuted material passing through the sieve-forming grate 32. The housing 14 confines the material thrown by the rotary comminuters and the fines which pass through the grates. Any hard, coarse, unreduced material will be deposited on the chute 34 and be discharged laterally of the housing, thus removing this material from the zone of action of the rotary comminuters. The vibration of the machine will aid in moving the lumps of material along the chute. The chute preferably forms a grate or sieve to permit passage of fines. The rear door 17 of the housing is adapted to form a strike-off for the deposited fines which have passed through the grates. In normal operation, a single pass of the machine will comminute all of the material in the swath to the desired fineness, the efficient pulverizing action of the machine avoiding the necessity for repeated trips over the same material. The comminuting action is thorough and is effected without excessive power consumption, as the fines are promptly removed from the comminuting zones. The comminuted material is then treated with a suitable binder, such as Portland cement or road oil, and is mixed and compacted to form a roadway. In some instances, the binding material, such as Portland cement, may be deposited on the scarified road material so as to be mixed by the machine during the comminuting operation.

In the modified form of pulverizing machine shown in Figs. 4 to 6, 60 designates a rectangular frame generally similar to the frame 10 of the machine of Figs. 1 to 3 and comprising side frame members 61 rigidly connected by front and rear cross members 62 and 63. Rigidly mounted on the frame, and in effect forming a part thereof, is a hood-like housing 64 which is closed at the top, front, rear and sides and is open at the bottom. The sides of the housing are formed by parallel vertical panels or walls 65 which are rigidly secured to the side frame members 61. The rear portion of the housing is sloping and includes outwardly swingable hinged doors 66 and 67. As in the machine of Figs. 1 to 3, the housing 60 is adapted to be moved over a bed of road material A to be pulverized.

A horizontal shaft 68 extends transversely within the housing and is journalled at one end in a gear casing 77 and at the other end in a bearing bracket 69, both the gear casing and bracket being rigidly secured to the housing. A drum 70, similar to the drum 20 of the device of Fig. 1, is carried on the shaft 67 to rotate therewith in the direction indicated by the arrows in Fig. 4 and is provided with tools 71 and 72, corresponding with the tools 21 and 22 of Fig. 1. A concave grate 73 extends between and is secured to the opposite side walls of the housing and includes cross bars 75. The grate extends partially around the drum at the top, rear and bottom thereof and has a forwardly projecting scoop-forming lower edge 74 below the drum. The curved portion of the grate is substantially concentric with the drum and is spaced a short distance from the circular path of the tool tips. The upper portion of the grate projects forwardly to the front wall of the housing. The tool drum forms a pulverizer and also forms a conveyer for carrying material rearwardly and upwardly along the grate.

The housing 64 is supported and drawn by a suitable vehicle 86 such as a truck or tractor or an intermediate trailer. A rearwardly projecting crane or jib 87 is pivotally carried by the vehicle and is adjustably elevated as by a hydraulic cylinder 88. The housing is suspended from the crane as by means of adjustably mounted suspension links 89 and 90 which may also form towing means for the housing. In some instances, however, a pivotally mounted towing bar 91 connects the vehicle and housing.

The gear casing 77 carries a drive shaft 92 projecting forwardly therefrom and provided with a bevel pinion 93 meshing with a bevel gear 94 on the tool drum shaft 68. The drive shaft is connected through universal joints 95 and 96 and an intermediate telescoping shaft 97 with a power shaft 98 carried by the vehicle. The power shaft is driven in any suitable manner, as by a gasoline engine, not shown.

The drive shaft 92 carries a plurality of axially spaced rotor plates 79 which at their peripheral portions support a series of spaced rods 80 extending parallel to the shaft. Hammers 81, here shown in the form of apertured square plates, are pivotally carried by the rods 80 and are disposed between the spaced rotor plates 79. A concave grate 82 extends partially around the hammer assembly or rotor at the bottom and opposite sides thereof and has an inlet opening at the top. The grate includes cross bars 83 and is rigidly secured to a side frame member 61 and to a surrounding casing 103 which is also secured to a side of the housing 64 to form an extension thereof and is open at its bottom. The drive shaft 92 is suitably journalled at the opposite ends of the casing 64, as by anti-friction bearings 78. The lower rotor and the cooperating grate 82 and casing 103 form a hammer mill unit.

A transverse chute 84, preferably in the form of a sieve with longitudinal bars, is carried by the housing 64 at a point spaced forwardly of the tool drum and above the level of the drum shaft 68 to receive material therein forwardly from the upper portion of the drum. Small pieces of material fall through the apertured chute while the larger pieces slide down the chute through an opening 85 in a side wall of the housing 64 and into the concave grate 82 of the hammer mill unit. The chute is carried on a horizontal shaft 104 which is journalled in the front wall of the housing and is frictionally or otherwise retained in angularly adjusted position. The chute is normally in the position shown by full lines in Fig. 6 to discharge material into the hammer mill unit, but is tiltable to the broken line position of Fig. 6 when the operation of the hammer mill is not required. In the latter case the material deposited on the chute falls on the scarified material in front of the tool drum. If desired, the side wall opening 85 may be closed by a swingably mounted door 105, Fig. 6, which is frictionally or otherwise suitably retained in open or closed position.

In the operation of the pulverizing machine of Figs. 4 to 6, the machine is drawn at a low rate of speed over the road bed to be worked, and the shafts 68 and 92 are driven at suitable rates of speed in the directions indicated by arrows. The rotary tools 21 and 22 break up the material, both by impact and by rubbing action against the concave grate 73, the comminuted material passing rearwardly through the grate. As in the machine of Figs. 1 to 3, about 80% to 90% of the compacted road material will be reduced to the desired fineness by the tool drum. The larger pieces of material are thrown onto the chute 84 and slide down the chute into the concave grate 82 of the hammer mill unit, where they are further reduced, the comminuted material falling through the grate to the ground. The vibration of the machine will aid in moving the lumps of material along the chute. In cases where the road material is fairly soft and is sufficiently reduced by the tool drum or rotor, the chute may be tilted to its inoperative position, whereupon the hammer mill rotor will rotate idly without any comminuting action.

By mounting the hammer mill rotor on the drive shaft, as in the machine of Figs. 4 to 6, the drive is somewhat simplified and fewer transmission parts are required.

While the pulverizing and mixing machines of the invention are particularly adapted for use in road building, they are also capable of use in other fields as in agriculture.

What I claim as new and desire to secure by Letters Patent is:

1. A pulverizing machine adapted to be moved over material to be pulverized, comprising a power-driven pulverizing rotor having a generally horizontal axis of rotation extending transversely of the direction of machine travel, a grate extending partially around said rotor at the rear and bottom thereof, and a housing extending over said rotor and grate and having a rear wall portion behind said grate forming a strike-off for fines passed through said grate, the lower portion of said grate forming a scraper for the material, said grate permitting the outward passage of fines therethrough from the zone of action of the rotor.

2. A pulverizing machine adapted to be moved over material to be pulverized, comprising a power-driven pulverizing rotor having a generally horizontal axis of rotation extending transversely of the direction of machine travel, a grate extending partially around said rotor at the rear and bottom thereof, said grate permitting the outward passage of fines therethrough from the zone of action of the rotor, the lower portion of said grate forming a scraper for the material, said machine having a second power-driven pulverizing rotor adapted to receive lumps of material insufficiently reduced in said first rotor, and a housing extending over said rotors and grate and having a rear wall portion forming a strike-off for the fines passed through said grate.

3. A pulverizing machine comprising a frame adapted to be moved over material to be pulverized, a pulverizing rotor mounted on said frame and rotatable about a generally horizontal axis extending transversely of the frame travel, a power shaft extending longitudinally of said frame approximately at right angles to the rotor axis and having a speed-reducing driving connection with said rotor, a second pulverizing rotor substantially coaxial with said power shaft and driven by said shaft, and means for transferring material laterally of said frame from said first rotor to said second rotor.

4. A pulverizing machine comprising a housing adapted to be moved over material to be pulverized, a pulverizing rotor in said housing having a substantially horizontal axis of rotation extending transversely of said housing, a grate within said housing extending partially around said rotor at the rear thereof for passage of fines, and a sieve-forming chute extending transversely of said housing adjacent the front of said rotor and adapted to receive material thrown from said rotor.

5. A pulverizing machine comprising a housing adapted to be moved over material to be pulverized, a pulverizing rotor in said housing having a substantially horizontal axis of rotation extending transversely of said housing, a transversely extending chute adjacent the front of said rotor adapted to receive material thrown from said rotor, and a second pulverizing rotor at the side of said housing adapted to receive material discharged from said chute.

6. A pulverizing machine comprising a housing adapted to be moved over material to be pulverized, a pulverizing rotor in said housing having a substantially horizontal axis of rotation extending transversely of said housing, a grate within said housing extending partially around said rotor at the rear thereof for passage of fines, and a sieve-forming chute extending transversely of said housing adjacent the front of said rotor and adapted to receive material thrown from said rotor, said sieve-forming chute permitting the dropping therethrough of deposited fines into the space within said housing and said housing having a side wall with a discharge aperture for said chute.

HARRY J. SEAMAN.